UNITED STATES PATENT OFFICE.

CHU FONG, OF NEW YORK, N. Y.

PROCESS OF MAKING BEVERAGES FROM RICE.

SPECIFICATION forming part of Letters Patent No. 528,514, dated October 30, 1894.

Application filed July 13, 1894. Serial No. 517,466. (No specimens.)

*To all whom it may concern:*

Be it known that I, CHU FONG, a subject of the Emperor of China, residing in the city and county of New York and State of New York, have invented new and useful Improvements in Processes of Making Beverages from Rice, of which the following is a full, clear, and exact description and specification of my invention.

This invention relates to beverages produced from rice.

The object is to produce a palatable drink from edible rice.

With this object in view, the invention consists in a process of producing a distilled beverage from edible rice, direct, without the use of malt, or the employment of molasses, or other saccharine substances, and under a single fermentation and distillation, employing rice-yeast to produce the fermentation, and then distilling the fermented liquor.

To carry the invention into effect, a quantity of edible rice, as distinguished from the wild red rice, which is poisonous, having been first hulled, is placed in a suitable vessel and boiled until it is perfectly soft, care being taken that the rice shall not burn or scorch. After the rice has been thoroughly boiled, it is allowed to stand until it has become cold. A yeast having been made with pure rice, this is added with some water, and the mixture is then well stirred. The rice yeast is is made as follows: Ten pounds of rice, five pounds of beans, and one pound of hong yuep leaves are ground together. Upon the flour produced, water is poured, and the mass is then mixed to a paste. This is allowed to stand until it becomes cold, and, after drying somewhat, the mass is cut into cakes, and is ready for use as yeast. The particular yeast described, is not claimed in this application, since the same will form the subject-matter of another application for patent. In this substance a strong-bodied nitrogenous yeast is presented, yet with preservation of the rice characteristics and flavor essential to the result in the manufacture of the particular rice beverage. The proportion of yeast employed is about six-and-two-thirds per cent. (6⅔%), that is, about fifteen pounds of yeast to one hundred pounds of rice, and the quantity of water added should be sufficient to make a paste. The large proportion of yeast is employed to produce the requisite conversion and fermentation with a high result in alcoholic spirits. The mass is then allowed to stand a sufficient time to undergo fermentation, the period varying, according to the season of the year, but being, in summer, usually about seven days, and, in winter, ten. After the mass has properly fermented, it is put into a still and subjected to the operation of distillation. The resulting liquor is a wholesome and palatable beverage, differing from "arrack" in taste and smell, and other characteristics, being a mild drink which is palatable without dilution, having the taste of rice, and being free from any oily or other unpleasant flavor.

It is to be observed that the beer or fermented liquor from which the beverage is distilled, is not "saké," and that, in its preparation, no molasses or other saccharine matter is employed; furthermore, that, in order to keep the same in transportation, it is not necessary to add to it oily or other matter; but, of course, any desirable flavoring material may be added, at any time, to satisfy the taste, although, this is not necessary, as the beverage, as it runs from the still, is agreeable in smell and palatable and free from any deleterious substance.

In the preparation of this beverage, no "moto" or "koji" is employed, but the fermentive agent is simply the pure rice yeast, whereby the resulting liquor is free from the taste of anything but rice, that is, free from the taste of strong ferments, or fungus growth, and, particularly, from that of the mycelium spores present in "koji."

It will also be observed, that the procedure in making this beverage and the beverage itself, differs from those under the production of so-called "rice-wine," a liquid made by adding fruit or other flavors to pure alcohol and then boiling the same with rice.

Inasmuch as wholesome edible rice is employed and not the wild red rice, whatever is left in the nature of mash, may be employed as feed, say, as chicken-feed, &c.

Having thus described my invention, what I claim as new, and desire to secure by Letters Patent, is—

The process of making a palatable beverage from rice, which consists in boiling edible hulled rice until it is soft, then allowing it to cool, then adding to the same water and pure rice yeast in the proportions described, subjecting the mass to a single fermentation, and then distilling, producing a beverage from edible rice, direct, and from rice alone, substantially as and for the purpose described.

CHU FONG.

Witnesses:
JOHN G. RITTER,
SAMUEL NEWMARK.